E. Rhodes,
Sawing Felloes.
No. 95,140. Patented Sep. 21, 1869.

Witnesses: Inventor
E. Rhodes
per
Attorneys

United States Patent Office.

EZRA RHODES, OF ERIE, PENNSYLVANIA.

Letters Patent No. 95,140, dated September 21, 1869.

IMPROVEMENT IN MACHINE FOR SAWING FELLOES.

The Schedule referred to in these Letters Patent and making part of the same.

*To all whom it may concern:*

Be it known that I, EZRA RHODES, of Erie, in the county of Erie, and State of Pennsylvania, have invented a new and improved Machine for Sawing Felloes; and I do hereby declare that the following is a full, clear, and exact description thereof, which will enable others skilled in the art to make and use the same, reference being had to the accompanying drawing, forming part of this specification.

This invention relates to new and useful improvements in machines for sawing felloes, designed to provide a more simple and effective machine than any now in use.

The invention consists in the combination of two concavo-convex saws with an adjustable mandrel, and an oscillating carriage, and in the arrangement of the automatic feeding-mechanism, as will be hereinafter more fully described.

Similar letters of reference indicate corresponding parts.

Figure 1:
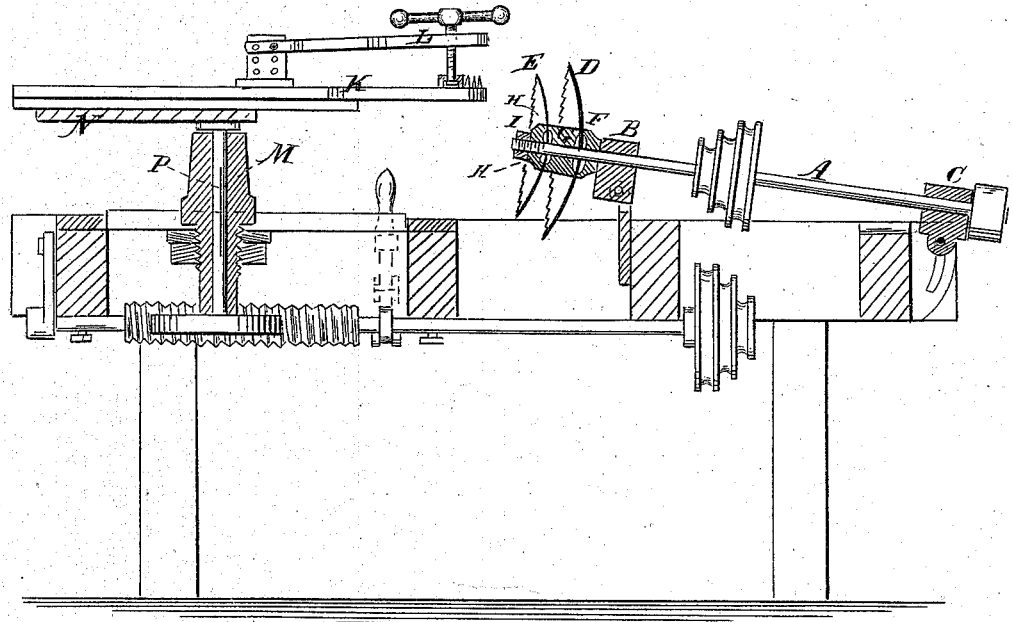
Figure 1 represents a longitudinal sectional elevation of my improved machine.
Figure 2:
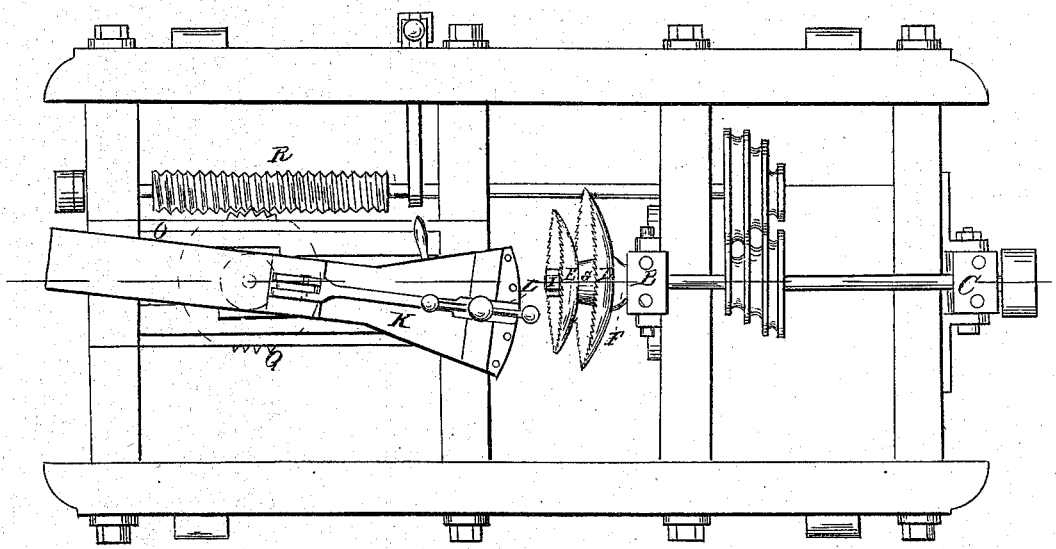
Figure 2 represents a plan view of the same.

A represents a mandrel, supported near one end in a pivoted bearing, B, and at the other end in a bearing, C, capable of movement and adjustment in a vertical plane on the axis of the bearing B.

D and E represent the saws, which are of concavo-convex form, and secured to the mandrel by the fixed collar F, movable collars G and H, and nut I. These collars are concaved or recessed upon the sides intended to bear against the saws, a sufficient amount of metal being removed therefrom to cause the said collars to bear only at their outer edges, and these edges are rounded, the curves thereof being less than the curvatures of the saws, whereby they are adapted to secure saws of any curvation, and I am therefore enabled to change the saws readily, for cutting felloes for wheels of various sizes, each set of saws being necessarily curved for felloes for wheels of one size.

K represents a carriage for holding and feeding the block, which is clamped thereon by the screw-clamp L.

The said carriage is supported on a stud, M, adjustable in proper supports to or from the saws, as required for felloes of different curvatures, and the said carriage is adjustable on the said support to feed the block up to the saws, the part N of the support forming a slide whereon the carriage moves to or from the saws.

A set-screw, O, is applied to the said carriage, to hold it at any point to which it may be set.

The part N of the support is fixed to a vertical shaft, P, passing through the stud M, and is provided with a worm-wheel, Q, at the bottom, gearing with a long worm, R, which is operated by a belt from the mandrel working over suitable cone-pulleys. This arrangement forms the means of automatically feeding the block past the saws.

The said mandrel may be adjusted in a vertical plane so as to present the saws to the block for cutting the felloes with right or other angular faces.

I am aware that two concavo-convex saws have been mounted upon the same mandrel for the purpose of sawing the inner and outer curvatures of felloes simultaneously, as illustrated in the patent of Thomas Smith, September 29, 1868, but this I do not claim.

I claim as new, and desire to secure by Letters Patent—

1. The saws D E, in combination with the adjustable mandrel and oscillating carriage, substantially as described, for the purpose specified.

2. The recessed collars F, G, and H, constructed as described, and applied to the saws D E, in the manner set forth for the purpose specified.

3. The arrangement of the carriage K L, adjustable carriage-support M N, shaft P, and worm-gears Q R, all operated substantially as specified.

The above specification of my invention signed by me, this 23d day of December, 1868.

EZRA RHODES.

Witnesses:
FRANK BLOCKLEY,
E. GREENE COLLINS.